United States Patent [19]
Reed et al.

[11] 3,961,164
[45] June 1, 1976

[54] UPC ENCODATION VERIFIER

[75] Inventors: George T. Reed; Laura Seidler-Gordon, both of Newark, Del.

[73] Assignee: Westvaco Corporation, New York, N.Y.

[22] Filed: Sept. 13, 1974

[21] Appl. No.: 505,906

[52] U.S. Cl. ............................. 235/61.12 N; 35/2
[51] Int. Cl.² .................. G06K 19/02; G09C 1/04; G06K 5/00
[58] Field of Search ............. 235/61.12 R, 61.12 N, 235/61.11 D, 61.11 E; 250/568, 569, 570; 33/1, 1 B, 1 C, 1 BB, 174 R, 174 B, 174 G, 174 K; 35/48 B, 2

[56] References Cited
UNITED STATES PATENTS

| | | | |
|---|---|---|---|
| 1,535,066 | 4/1925 | Vahjen | 35/2 |
| 2,857,687 | 10/1958 | Erdman | 35/2 |
| 3,211,470 | 10/1965 | Wilson | 235/61.12 N |
| 3,220,301 | 11/1965 | Koonz | 235/61.12 R |
| 3,344,529 | 10/1967 | Brown | 33/174 R |
| 3,418,728 | 12/1968 | Conceyro | 35/2 |
| 3,564,718 | 2/1971 | Goode | 33/1 B |
| 3,609,880 | 10/1971 | Arbon | 235/61.12 R |
| 3,839,625 | 10/1974 | Chadima | 235/61.12 N |

Primary Examiner—Daryl W. Cook
Assistant Examiner—Robert M. Kilgore

[57] ABSTRACT

A method and the means for practicing the method is disclosed for verifying the encodation accuracy of a Universal Product Code master symbol that is to be printed on a consumer product carton or the like. The means for practicing the method consists of an Encodation Verifier which is preferably printed on a piece of film or glass and which includes 113 numbered light spaces and dark bars which represent the total modules of the code symbol, and an Encodation Worksheet form on which information obtained form comparing the Encodation Verifier with the symbol to be verified, is entered. Thus, the method for verifying the symbol encodation comprises a graphic comparison of the Encodation Verifier with the symbol to be verified. The method is preferably practiced visually under low power magnification but could be done mechanically with an optical device such as a reader/printer machine.

1 Claim, 3 Drawing Figures

FIG. 1
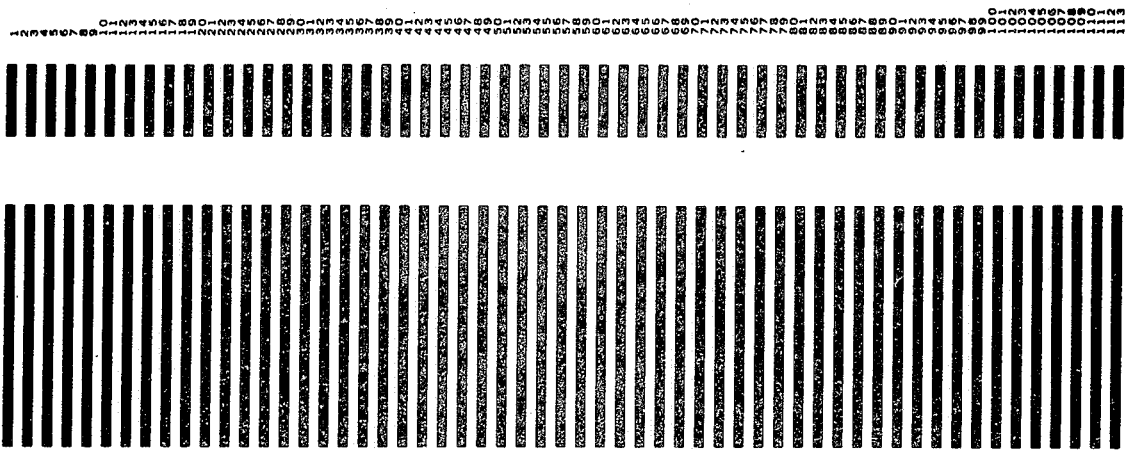
FIG. 2

FIG. 3

UPC ENCODATION VERIFIER

BACKGROUND OF INVENTION

Universal Product Code (UPC) encoding is a far reaching program that was first developed for the grocery industry to help identify and control thousands of different items found on supermarket shelves. The coding is carried out by printing "machine readable" code symbols on the labels of consumer packages. Then, at the supermarket checkstand, special optical/-laser scanning devices are provided which "read" the code symbols and automatically carry out price lookup and inventory control steps with the final objective being a completely automated checkstand.

Besides consumer packages, UPC symbols are also intended for use on shipping cases and containers, and for in-pack and mail coupons for premiums or discounts. Moreover, even though UPC coding was started for groceries, there are provisions for expanding its use into drugs and health related items, general merchandising and the mass distribution industry.

The standard UPC symbol is in the form of a series of parallel light spaces and dark bars of different widths. In this form, the UPC symbol is referred to as a linear bar code symbol with numerical OCR-2 type font equivalents of the light spaces and dark bars printed at the bottom of the symbol. The overall shape of the symbol is rectangular and each different arrangement of the light spaces and dark bars represents a particular and specific numerical code.

The code symbol was designed primarily for the grocery industry which adopted a numbering system of 10 numerical characters. However, the symbol also includes a certain amount of growth capacity for longer codes (i.e., 11 and 12 characters) to facilitate compatibility in other industries in the future. The symbol even provides a format capable of encoding from 13 to 30 characters to promote compatibility with the needs of department stores.

The 10 digits in the grocery code include 5 which identify the manufacturer, and 5 which identify the product itself. In addition to the 10 digits, the symbol also contains a UPC number system character, two left and right guard bars, a pair of center bars, and a modulo check character. For any given 10 digit code, there are 30 dark bars and 29 light spaces in each symbol with a light margin on each side. Each digit of the code is encoded by 2 dark bars and 2 light spaces, and is called an (encoded) character. Each character is made up of 7 data elements called "modules". A module may be either dark or light and a bar may consist of from 1 to 4 dark modules and a light space may consist of from 1 to 4 light modules. There are 95 data modules in the regular UPC symbol, 11 left margin modules and 7 right margin modules yielding a total of 113 modules for the entire symbol. Each module is nominally 0.0130 wide. The nominal size UPC symbol has an area of 1.4984 square inches (1.469 inch × 1.020 inch). The symbol however, may be larger or smaller than nominal, depending on the print quality of the printing press involved and the space provided for printing the symbol. Thus it may be seen that the key to the success of the UPC symbol lies in the necessity to print the symbol accurately and with clarity to enable optical or laser scanners to read the symbols.

SUMMARY OF INVENTION

The present invention was developed as a result of a need to verify the encodation accuracy of UPC symbols prior to the printing process. The UPC symbol must be accurate in at least three ways: (1) the symbol must correctly represent the assigned numeric code; (2) the artwork tolerances must be accurate at the film master stage; and, (3) the final printed image of the symbol must be within prescribed tolerances to permit the symbol to be scanned.

The latter two criteria for the accuracy of the UPC symbol lie primarily in the hands of the printer. Thus the printer must determine the printability range of his press, i.e., the tendency for bar width growth and variance under printing conditions, and then modify the film master symbol before printing to compensate for anticipated printing variables and conditions. However, the verification of the code symbol is to make sure that it's encoded data corresponds to the assigned numerical code which can only be accomplished visually by a direct comparison of the light spaces and dark bars in the symbol with known and fixed ratios or values for the numerical code.

At the present time there is available a hand held, wand type fibre optics scanner which can be used to decode UPC symbols. The known device is called a "wandable" or "hand held scanner" and is manufactured and distributed by the Norand Co., Roseville, Mn. 55113, among others. However, the cost of hand held scanners is relatively expensive and the use of the device does not provide a record of the actual verification process. It further does not indicate marginally correct encodation as to bar and space widths. Accordingly, in view of the need for verifying the encoded data of UPC symbols and because the only devices presently available are relatively expensive and not fully satisfactory as noted above, the present invention as developed.

DESCRIPTION OF DRAWING

FIG. 1 illustrates an enlarged plan view of the Encodation Verifier of the present invention;

FIG. 2 illustrates an enlarged plan view of a typical UPC master symbol; and,

FIG. 3 illustrates an Encodation Worksheet for grocery items.

DETAILED DESCRIPTION

Figure 3:
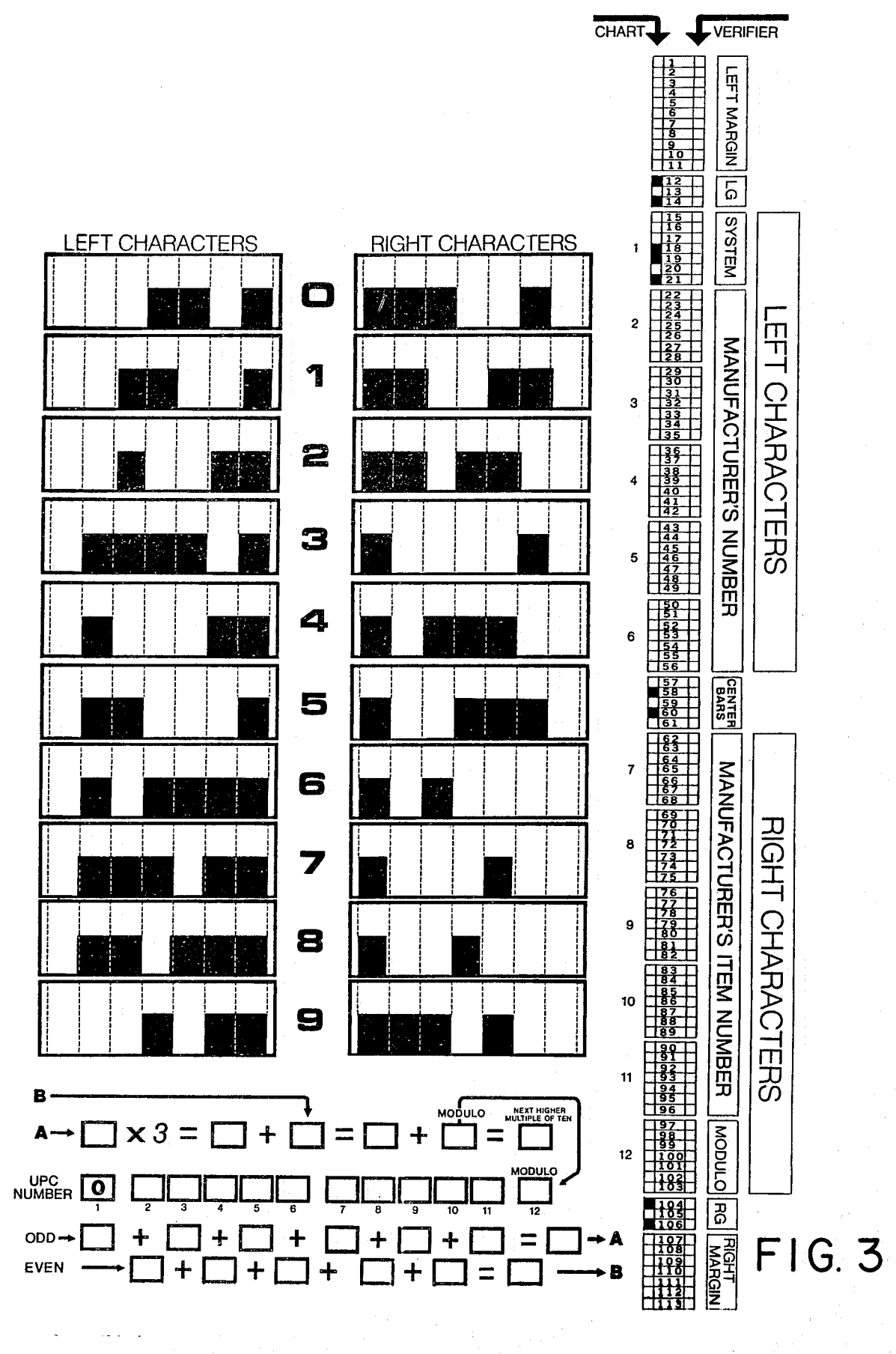

The present invention consists primarily of two basic elements illustrated in FIGS. 1 and 3. FIG. 1 shows an enlarged view of the Encodation Verifier image as it would appear on a piece of film or glass. In its preferred form, the image includes all 113 total modules of the master UPC symbol. Thus, the Encodation Verifier consists of 57 equally divided dark bars and 56 intervening light spaces numbered consecutively from 1 to 113. FIG. 3 shows an encodation worksheet for grocery items, identified by the UPC number system 0, and which includes thereon; (1) a UPC character chart (0–9) corresponding to a graphic representation of the module structure of each digit in the UPC symbol; (2) a formula for determining the modulo check character; and (3) a bar chart consisting of two columns of squares numbered 1–113 for entering information obtained independently from the UPC character chart and from the Encodation Verifier. Meanwhile, FIG. 2 shows the UPC standard symbol with its numeric code identified.

With particular reference to FIG. 3, it will be noted that the graphic representation of the module structure of each UPC character in the symbol is identified by two sections marked "left characters" and "right characters". The left characters correspond to the manufacturer's UPC number which is assigned by Distribution Codes, Incorporated, (DCI) on behalf of the Uniform Grocery Product Code Council. The right characters identify the product itself and are assigned by the manufacturer.

The bar chart consisting of 113 numbered squares in two columns is located at the right side of the Encodation Worksheet shown in FIG. 3. The column on the left is identified by the word "chart" and the column on the right is identified by the word "verifier". The numbered squares correspond to the 113 dark bars and light spaces on the Encodation Verifier of FIG. 1. In addition, the bar chart is illustrated as being further divided into basic units represented by groups of different squares. For instance, squares 1 to 11 represent the left margin of the UPC symbol; squares 12-14 the left guard; squares 15-21 the UPC number system; squares 22-56 the manufacturer's number; squares 57-61 the symbol center bars; squares 62-96 the product identification numbers; squares 97-103 the modulo check character; squares 104-106 the right guard; and, squares 107-113 the right margin. Further, it will be noted that the squares between 15 and 56, and between 62 and 103 are additionally divided into segments identified by the bar chart numerals 1-12. These numerals represent the different UPC characters. Each numbered segment consists of 7 independent squares which correspond to the graphic representation of the module structure of each of the left and right UPC characters given in the UPC character chart on the Encodation Worksheet. The same numerical representation, i.e., 2-6 and 7-11, for the manufacturer's number and the manufacturer's product is shown at the bottom of the Encodation Worksheet opposite the line marked "UPC NUMBER". This entry is used for computing the modulo check formula.

Returning once again to FIG. 3, and by referring to the bar chart on the Encodation Worksheet, it may be seen that the UPC symbol also includes two UPC characters (1 and 12) beyond the 10 needed (2-6 and 7-11) to encode the manufacturer's number and product number. The character 0 encoded in modules 15-21 (bar chart numeral 1), and which falls at the left side of the UPC symbol as shown in FIG. 2, represents a particular UPC numbering system. At this time the number system 0 is assigned to grocery items; number system 2 to random weight items such as meat and produce; number system 3 to drugs and health related items, etc. Other different system numbers will be adopted for classifying other broad categories of goods to be encoded with the UPC symbol. Meanwhile, the character represented by the numeral 12 on the Encodation Worksheet is the modulo check character and is encoded in the UPC symbol to ensure detection of encoding errors. The numerical value of the modulo check character is calculated by using the formula provided at the bottom of the Encodation Worksheet shown in FIG. 3. The formula for calculating the modulo check character is not a part of the present invention since it is provided by DCI. The formula has been arranged graphically and is included on the Encodation Worksheet in FIG. 3, since the determination of the modulo check character is required before the UPC symbol can be verified according to the present invention.

Further reference to FIG. 2 shows that the encodation of the master UPC symbol begins at the left side, following the light margin, with a pair of guard bars, followed by a number system character, followed by 5 characters corresponding to the manufacturer's number, followed by a pair of center bars, followed by the 5 characters which correspond to the product marketed followed by the modulo check character, followed by a second pair of guard bars, and finally a right margin. Thus the first two bars at the left of the UPC symbol and the last two bars at the right of the symbol comprise the left and right guard bar positions and are encoded dark bar-light space-dark bar. This encodation is designed to fall on the modules identified as 12-13-14 and 104-105-106 of the bar chart of FIG. 3. In a similar manner, the center bar position is encoded light space-dark bar-light space-dark bar-light space and is designed to fall on the modules identified as 57-58-59-60-61 of the bar chart of FIG. 3.

The encodation for the 5 left characters (manufacturer's number) and the 5 right characters (product identification) shown in FIG. 2 comprises the module representation of a ficticious UPC number 0-1-2-3-4/5-6-7-8-9 as determined from the left and right characters of the UPC character chart on the Encodation Worksheet of FIG. 3. From the chart in FIG. 3, it may be noted that the number of dark modules per character on the left side is always either 3 or 5, and the number of dark modules is either 2 or 4 for the right side characters. Furthermore, encoding is identical for all characters on a given side of the symbol, viz., the number system character is encoded as a left side character and the module check character is encoded as a right side character. Another characteristic of the characters is that each character on the left side of the center bars begins with a light space and ends with a dark bar. Correspondingly, the characters on the right side of the center bars begin with a dark bar and end with a light space. This latter characteristic plus the "odd-even" use of dark modules for each of the left and right characters provides an odd and even parity encodation for each character and is important in scanning and decoding the symbols.

However, for a more complete understanding of the invention herein, the standard UPC master symbol shown in FIG. 2 will be verified using the tools and applying the method of the present invention. The first step is the selection of the appropriate Encodation Worksheet. As pointed out hereinbefore, the first character in the UPC symbol represents the number system a particular symbol uses. The system characters are assigned to different groups of goods which utilize the UPC symbol encodation process. Moreover, as noted in the UPC master symbol shown in FIG. 2, the number system is indicated as being a 0 by the presence of the zero printed at the left side of the symbol. Thus to verify the UPC symbol shown in FIG. 2, the correct Encodation Worksheet would be the one identified with the legend Number System 0. This number along with the numerical code for the UPC symbol (0-1-2-3-4/5-6-7-8-9) is then entered in the UPC number character blocks indicated by numerals 2-6 and 7-11 at the bottom of the Encodation Worksheet.

The next step in the verification procedure is to calculate the modulo check character for block 12, following the formula shown. For this purpose, each of the odd digits in the UPC number blocks is summed to yield a total of 25 (0+1+3+5+7+9=25) which amount is then entered in block "A". Next, each of the even digits in the UPC number blocks is summed to yield a total of 20 (0+2+4+6+8=20) which amount is then entered in block "B" of the encodation worksheet. Then, following the formula given, 25 times 3, equals 75, plus 20, equals 95. Next, the smallest number which when added to 95 to produce a multiple of 10 is added to the total of 95. Thus, the modulo check character in this example is 5 yielding a total of 100. The modulo check value (5) is then entered in the UPC modulo character block identified by the numeral 12. At this point, the lower part of the Encodation Worksheet is completed and the next step in the verification procedure comprises the completion of the "chart" column of the bar chart provided at the right side of the Encodation Worksheet.

As previously indicated, the bar chart comprises 113 numbered squares corresponding to the 113 total modules in the UPC symbol. The bar chart is further designated by segments for the user's convenience, identified as Left Margin (modules 1–11); Left Guard (modules 12–14); UPC Number System (modules 15–21); Manufacturer's Number (modules 22–56); Center Bars (modules 57–61); Product Identification Number (modules 62–96); Modulo Check Character (modules 97–103); Right Guard (modules 104–106); and, Right Margin (modules 107–113). These segments, including the UPC Number System and the Modulo Check Character, are also separately identified by the bar chart numerals 1–12 which correspond with the UPC number characters provided at the bottom of the worksheet. Accordingly, in order to complete the chart column of the bar chart, reference is made to the UPC number at the bottom of the sheet and the graphic module representation in the UPC character chart of the left and right characters provided in the center of the worksheet.

A further study of FIG. 3 shows the characters of the UPC number identified by numerals 1-6 as "left" characters and the characters identified by numerals 7–12 as "right" characters. Each of these characters are further independently represented by seven data elements or modules in the UPC character chart. Left and right characters consist of light modules and dark modules which make up the different bars and spaces for each character. For example a "left 5" is graphically represented by one light module, two dark modules, three light modules and a dark module. Meanwhile, a "right 5" is graphically represented by a dark module, two light modules, three dark modules and a single light module. Therefore, it may be seen that both the left and right 5's consist of 2 bars/2 spaces with the bars consisting of single or grouped dark modules and the spaces consisting of single or grouped light modules.

Since the left guard, center bars and right guard are fixed or known for a particular version of the Encodation Worksheet version, their module representation has been previously filled in on the worksheet by the dark modules at 12, 14; 58, 60; and 104, 106. Similarly, for the 0 Number System (or Grocery Code), the character identified by the numeral 1 on the bar chart can be filled in as three light modules (15–16–17) two dark modules (18–19), a light module (20) and a dark module (21). The module representation of the character can be checked however, by referring to the UPC character chart for a "left zero" from the left character column provided on the worksheet. Note the three light modules, two dark modules, a light module and a dark module. In a similar manner, the information required to complete the chart column of the bar chart is found from referring to the left and right characters respectively using the UPC character chart provided on the worksheet.

The next character in the UPC number for the master symbol illustrated in FIG. 2 (and as filled in at the bottom of the worksheet) is also a left 0. Therefore, the character left 0, identified by the numeral 2 on the bar chart, is filled in in the chart column with three light modules (22–23–24), two dark modules (25–26), a light module (27) and a dark module (28). Next, a left 1 is identified by the numeral 3 on the bar chart. Therefore, referring to a left 1 in the character chart, the modules 29–35 are filled in with two light (29–30), two dark (31–32), two light (33–34), and a dark (35). The same sequence is used to fill in the chart column for left characters 2, 3, 4 which are represented by the bar chart numerals 4–5–6. Thus, a left "two", represented by modules 36–42 on the bar chart is filled in with two light modules (36–37), a dark module (38), two light modules (39–40), and two dark modules (41–42). In a similar manner, the chart column right characters, represented by numerals 7–11 on the bar chart, are filled in with the module representation, for UPC numbers 5–9 referring to the right character on the character chart. The modulo check character 12, another right 5, is also filled in with its module representation from the right character chart. For example, bar chart numbers 7 and 12, which are both right "fives" are filled in at spaces 62–68 and 97-103 of the chart column by referring to the character chart showing a right 5 with a dark module at (62 and 97), two light modules at (63–64 and 98–99), three dark modules at (65–6-6–67 and 100–101–102), and a light module at (68 and 103). Similarly, a right 7 for instance, which corresponds to the bar chart number 9 is filled in at 76–82 of the bar chart with a dark module (76), three light modules (77–78–79), a dark module (80), and two light modules (81–82). In the manner described above, each of the characters 1–12 of the chart column of the bar chart can be filled in with their module representation from the character chart of left or right characters as the first step in the visual comparison technique employed by the present invention to verify the UPC symbol itself. The next step in the verification procedure requires the use of the Encodation Verifier illustrated in FIG. 1.

As peviously pointed out, the Encodation Verifier is printed on a piece of transparent film, glass or the like and is used to verify the UPC symbol film master with the visual technique described hereinafter. For this purpose, the UPC symbol film master is secured in place on a work table with a light background to afford good visibility. The Encodation Verifier is then placed over the film master with module 12 of the verifier lined up with the UPC symbol left guard bar. When properly positioned, module 106 of the Encodation Verifier should fall directly over the outside right guard bar. Then with a magnifying glass or other optical viewer designed primarily to enlarge the small nominal size UPC symbol, each module of the Encodation Verifier is compared with the corresponding opposite space of the UPC symbol and the information obtained from this comparison is entered in the verifier column of the bar chart. Since the disclosure herein does not include transparent films of the UPC symbol and the actual Encodation verifier, FIGS. 1 and 2 of the present invention, which illustrate enlarged versions of these elements, have been aligned one above the other to simulate the actual use where the two films would lie directly on top of one another.

When the above arrangement is fully set up, and with the viewer in place, it can be seen that the space opposite module 12 of the Encodation Verifier is filled with a dark bar on the UPC symbol. Therefore the module at 12 should be filled in on the verifier column. Similarly, the space opposite module 13 of the Encodation Verifier is a blank space, thus the module at 13 in the verifier column should be left blank. The space opposite module 14 of the Encodation Verifier is filled with a dark bar thus the module at 14 on the bar chart should be filled in. The space opposite modules 15-1-6-17 of the Encodation Verifier match up with a blank space on the symbol, thus the modules at 15-16-17 of the bar chart should be left blank. Further viewing shows that the space opposite modules 18-19 of the Encodation Verifier match up with a dark bar on the UPC symbol, thus the modules at 18-19 on the bar chart should be filled. And, finally, the spaces opposite modules 20 and 21 of the Encodation Verifier are matched up respectively with a blank space and a dark bar. Thus, the modules 20 and 21 of the bar should be left blank and filled in respectively.

Continuing with the above procedure, one is able to completely fill in the verifier column of the bar chart and then by comparing the chart column with the verifier column, the UPC symbol encodation can be verified. If the chart and verifier columns do not match, errors can be detected and pinpointed by the present invention. In addition, the invention yields a permanent record of the verification of the symbol, defining responsibility. Furthermore, even though the invention has been described in particular as a "human readable" system, wherein a visual comparison of the graphic representation of the symbol is carried out, it is believed that the present invention could just as readily be practiced with a mechanical optical reader and printer device or the like. Thus if the invention were to be practiced automatically and without human assistance, a reader/printer or some other equivalent device could be employed to initially translate the numeric code of the UPC symbol to its module equivalent. This information would then be printed on the bar chart utilitized herein or in some other similar chart form. The same reader/printer or other equivalent device could then be used to optically compare the symbol encodation with the Encodation Verifier and the results therefrom similarly would be printed on the bar chart herein or in a chart form compatible with the chart provided from the module translation of the numeric code. Subsequently, the two charts could be compared either by the human eye or with the same or another reader/priner/comparator device to determine the verification of the encoded symbol.

Therefore it may be seen that the present invention discloses a novel and versatile method and the means for practicing the method whereby an encoded symbol may be verified and corrected if necessary. In particular, the invention concerns a method and the means for practicing the method whereby a Universal Product Code symbol can be verified to determine its accuracy in depicting the manufacturers number and product identification number assigned to the particular product. Moreover, even though only a single embodiment of the invention has been fully disclosed herein, it should be understood that changes in the preferred method and means for carrying out the method might be made without deviating from the scope of the invention as defined in the appended claims.

We claim:

1. A method for verifying the accuracy of an encoded linear bar code symbol comprising in combination a template and an encodation worksheet, said template comprising a substantially rigid and transparent planar sheet having an image printed thereon, said image consisting of a plurality of equally spaced dark bars and intervening light spaces corresponding to the modules of a linear bar code symbol, said encodation worksheet comprising a printed sheet including a character chart of the module representation of the numeric equivalents of a linear bar code symbol, a formula for determining the check character of said bar code symbol and a bar chart consisting of two columns divided into equally sized spaces corresponding to the modules of said bar code symbol, said columns comprising a chart column and a verifier column, said method comprising the steps:

a. translating the numeric equivalent of an encoded linear bar code symbol into its graphic representation with the aid of the character chart on said encodation worksheet;
  b. entering the graphic representation of the translation made in step (a) in the chart column of the bar chart on said encodation worksheet;
  c. orienting the template in superimposed relation to said encoded linear bar code symbol and comparing the image on said template with the modules of said bar code symbol;
  d. entering the graphic representation of the comparison made in step (c) in the verifier column of the bar chart on said encodation worksheet; and,
  e. correlating the graphic representations of the encoded bar code symbol as entered in the chart and verifier columns of said encodation worksheet in order to verify the accuracy of said encoded symbol.

* * * * *